March 21, 1961  J. W. BOSSUNG  2,976,525
SYSTEM FOR CONVERTING ANALOG SHAFT ROTATIONAL
POSITIONS TO DIGITAL DISPLAYS
Filed June 19, 1956  2 Sheets-Sheet 1
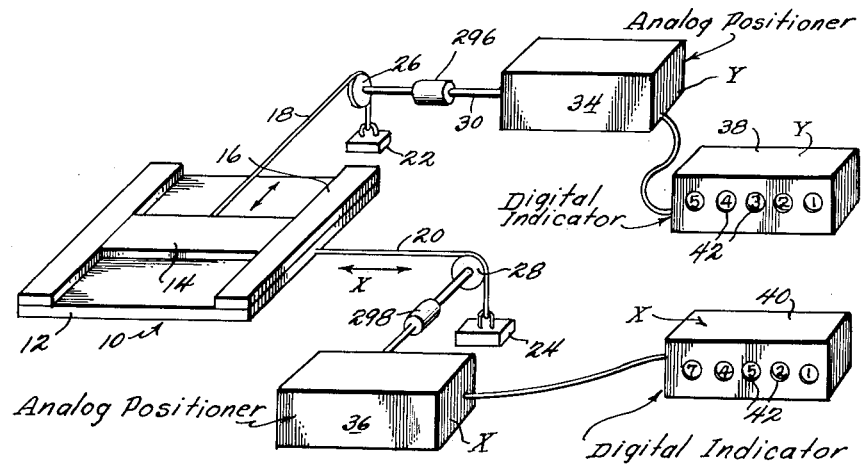
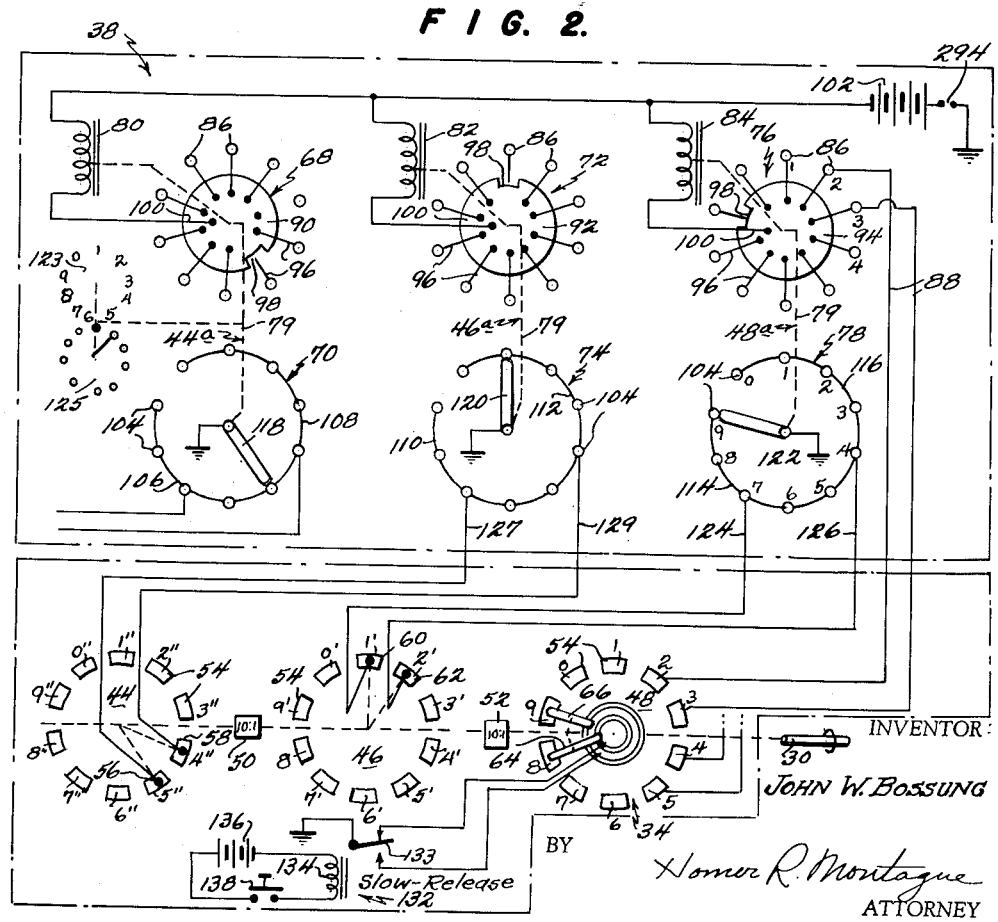
INVENTOR:
JOHN W. BOSSUNG
BY
Homer R. Montague
ATTORNEY March 21, 1961
J. W. BOSSUNG
2,976,525
SYSTEM FOR CONVERTING ANALOG SHAFT ROTATIONAL
POSITIONS TO DIGITAL DISPLAYS
Filed June 19, 1956
2 Sheets-Sheet 2
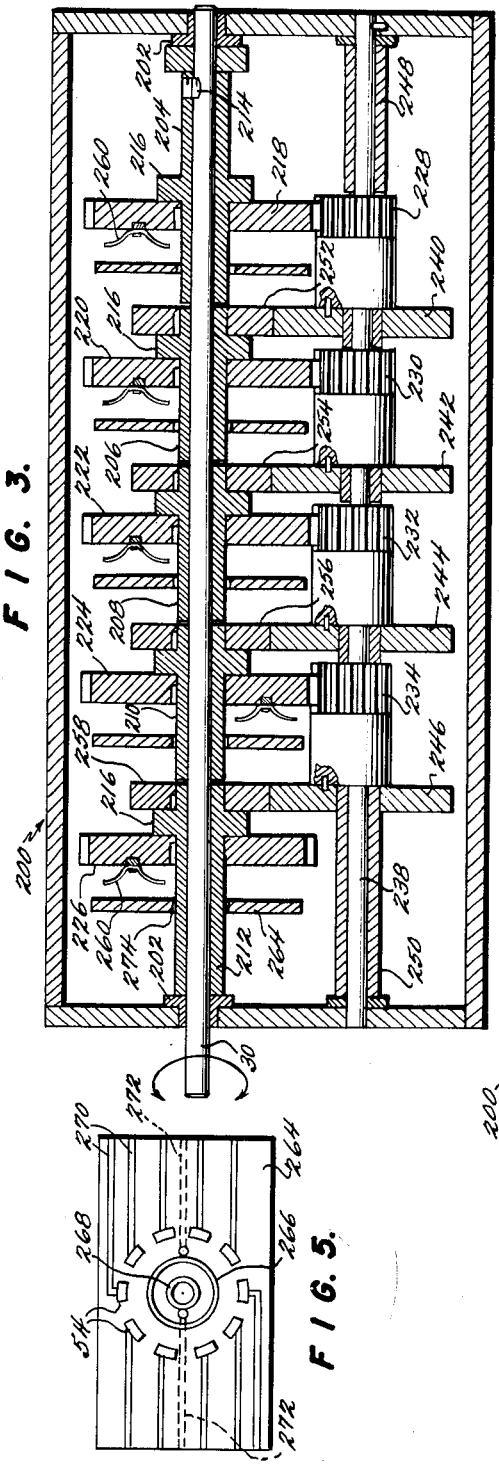
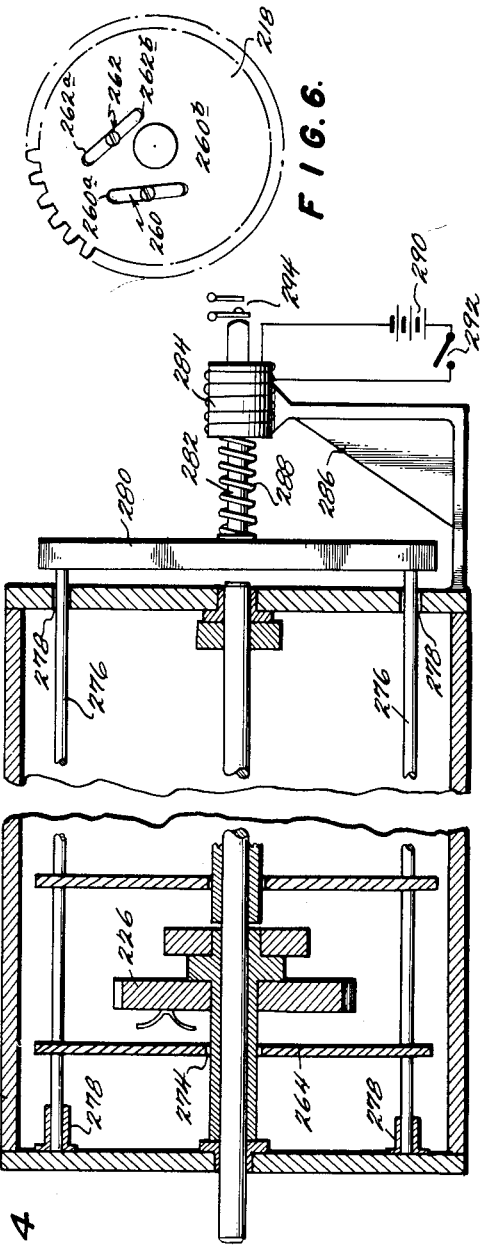
INVENTOR:
JOHN W. BOSSUNG
BY Homer R. Montague
ATTORNEY United States Patent Office 2,976,525
Patented Mar. 21, 1961

2,976,525

SYSTEM FOR CONVERTING ANALOG SHAFT ROTATIONAL POSITIONS TO DIGITAL DISPLAYS

John W. Bossung, Mount Vernon, N.Y., assignor to Sherman Fairchild & Associates, Inc., a corporation of New York Filed June 19, 1956, Ser. No. 592,444

4 Claims. (Cl. 340—316)

This invention relates to a system for converting analog shaft rotational positions to non-ambiguous digital displays, and more particularly to unique combinations and sub-combinations in such a system. The invention is particularly well adapted for, but not restricted to, the display of figures representative of the cartesian coordinates of a point, the location of which with respect to the origin of a reference system it is desired to determine.

In the analysis of maps or photographs it is frequently desirable to determine the exact location of a point on the subject being analyzed with respect to reference axes. In the prior art schemes for performing this function, cross-hairs are usually caused to coincide with the point to be located, and in the operation of the apparatus for moving the cross-hairs, outputs are produced which are representative of the linear distance of the respective cross-hairs from the associated orthogonal reference axes. Generally, these outputs are in the form of rotational or angular shaft positions which are converted by some form of indicator to a visual display of linear distance. The display apparatus employed in the prior art systems is primarily of the analog type. Where fast, extremely accurate displays are desired, or where the data are to control computer operations, such apparatus is completely inadequate. In such instances a digital display is preferred.

Accordingly, it is a principal object of the present invention to provide a unique analog to digital converter.

Another object of the present invention is to provide a unique system for converting shaft rotational position analogs to digital presentations.

A further object of the invention is to provide apparatus of the foregoing type which is highly accurate and reliable, which is light weight and compact, and which requires no vacuum tubes, accurate machining, or fine adjustment.

An additional object of the invention is to provide a unique analog to digital converter including separate positioning and display units which may be installed at widely separated installations.

Still another object of the invention is to provide an analog to digital converter providing a plurality of outputs, all of which are obtained from rugged switches rather than from delicate gearing.

Yet another object of the invention is to provide a device for converting shaft rotation analogs to digital electrical outputs, and in which the rotation of an input shaft is employed in effect to store the desired information until an electrical read-out is required.

A still further object of the invention is to provide a unique system for digital display in which the display units of the digital output are arranged so that each unit controls the change in display of the unit corresponding to the place of the next higher order.

An additional object of the invention is to provide digital display apparatus in which ambiguities, due for example to gear tolerances, are reduced to the point of complete elimination.

A further object of the invention is to provide a unique switching system.

Another object of the invention is to provide a novel system including a plurality of multi-brush electro-mechanical transmitting devices, arranged to control a corresponding plurality of electro-mechanical receiving devices.

Still another object of the invention is to provide a system of the aforesaid type in which the receiving devices are not only arranged to "home" in accordance with the positions of the transmitting devices, but also are arranged to control succeeding receiving devices so as to prevent ambiguities and the accumulation of errors.

Still another object of the invention is to provide a system of the aforesaid type in which the receiving devices perform visual display functions and in addition provide outputs for the operation of a recorder, such as a card punching machine, or more complex data-handling computer.

A still further object of the invention is to provide a novel system for displaying shaft rotational position analogs as a single row of integers.

An additional object of the invention is to provide positioning apparatus having a unique gearing arrangement.

The foregoing and other objects of the invention and the manner in which these objects are accomplished will become more apparent in the following detailed description of the invention taken in conjunction with the accompanying drawings wherein:

Fig. 1 is a diagrammatic illustration of an overall system for determining the cartesian coordinates of a point on a map or photograph, the system including analog to digital converters of the type provided by the present invention.

Fig. 2 is a schematic diagram of a preferred form of the electrical circuit of the present invention.

Fig. 3 is a longitudinal vertical section through a preferred form of positioning unit constructed in accordance with the invention.

Fig. 4 is a segmental longitudinal horizontal section through the unit of Fig. 3.

Fig. 5 is an elevational view of a preferred form of commutator board employed in the apparatus of the invention.

Fig. 6 is an elevational view of a preferred form of brush and brush carrier utilized in the system of the invention.

Briefly, the apparatus of the present invention includes an analog positioning unit which varies the position of a plurality of electro-mechanical transmitting devices in accordance with the rotational position of an input shaft which it is desired to convert to a digital registration or display. The outputs of the electro-mechanical transmitting devices are arranged to control a corresponding plurality of electro-mechanical receiver devices forming part of a visual display unit which may be located remotely from the analog positioning unit. The display unit includes a plurality of integer indicating devices corresponding, respectively, to the ordinal places of the numbers to be indicated. While the invention is illustrated and described with reference to a decimal system, it will be appreciated by those skilled in the art that the principles of the invention may be applied to systems employing a radix other than ten.

The analog positioning unit is arranged to store the shaft position mechanically and to provide electrical outputs determined by the shaft position when a read-out is required. The receiver devices of the visual display unit are preferably of the homing type and automatically move to positions corresponding to those of the associated transmitters. The receivers may provide outputs for controlling a suitable recorder as well as provide the integer display. The arrangement of the apparatus is such that each receiver controls the changing of the display for the receiver corresponding to the place of the next highest order, thereby eliminating ambiguities.

Referring to Fig. 1 of the drawing, the apparatus of the present invention is illustrated in its application to a system for determining the cartesian coordinates of a point on a reference plane. This system may include a carriage 10 having a lower portion 12 and an upper portion 14. The lower portion is arranged for horizontal motion along an X coordinate axis and carries the upper portion with it. The upper portion is arranged for motion with respect to the lower portion along a Y coordinate axis and is mounted to reciprocate on the lower portion in a pair of ways or guides 16. A pair of cables 18, 20 having weights 22, 24 attached at one end of each, have their respective other ends connected to the upper and lower portions of the carriage as indicated. Each cable is passed over a pulley 26, 28, and the pulleys are arranged to rotate associated shafts 30, 32. While the showing is diagrammatic and will in practice require that the pulley 26 be movable along with the lower portion of the carriage, it will be apparent that if the necessary precautions are taken, the shafts 30 and 32 will rotate proportionally to the reciprocative motion of the respective carriage portions. A more detailed showing of suitable structure for this purpose is given in the copending application of Alfred K. Boyd, filed June 19, 1956, Serial No. 592,445, now abandoned. Thus, the angular position of the shafts will be representative of the linear position of the carriage portions, and if the carriage is moved with respect to a pair of fixed cross-hairs (not shown) the angular position of the shafts will represent the cartesian coordinates of a point on the upper carriage portion below the cross-hairs with respect to the reference axes.

Each of the shafts 30, 32 is arranged to control an analog positioning unit 34, 36, respectively. These units provide electrical outputs which are connected to control a corresponding pair of digital visual display units 38, 40. Each visual display unit has a plurality of windows 42 behind which a corresponding plurality of integer indicators are positioned. The windows correspond to the respective places of the numbers to be indicated. For example, with five windows, the number 99,999 will represent the highest decimal figure which can be indicated. If the indicator devices behind the respective windows are controlled in the proper manner, a digital display of the shaft rotational positions may be obtained.

Referring to Fig. 2, the circuit diagram of the apparatus of the present invention may be divided into two parts, that part within dot-dash block 34 corresponding to the elements and components of the analog positioning unit, and that part within rectangle 38 corresponding to elements and components within a digital visual display unit. The circuit diagram illustrates the apparatus for a single cartesian coordinate, but it will be apparent that identical apparatus may be employed for the other coordinate. The mechanical input to the analog positioning unit is designated by the dash line 30, which represents the shaft with the same designation. The input shaft is arranged to drive three commutator switches 44, 46 and 48. Other commutator switches and associated parts to be described may be added where a display of a number requiring more than three places is desired. Switch 48 may be driven directly from the input shaft, while switches 44 and 46 may be driven through gear reduction units 50, 52. In a decimal type system each switch has ten segment contacts 54 arranged in a circle. These contacts represent the integers 1 through 9 and zero, and the corresponding contacts of the switches have been distinguished through the use of primes and double primes.

In the form shown, each commutator switch has a pair of brushes, the elements of which are designated respectively 56, 58; 60, 62; and 64, 66. The brushes of each switch are arranged to engage their associated contacts sequentially, and while in the embodiment disclosed it is preferred to rotate the brushes from the input shaft, holding the commutator segments fixed, it will be apparent that the opposite arrangement is also satisfactory. The brushes of each pair are fixed with respect to one another and the spacing of the brushes and the dimensions of the contacts are such that each pair of brushes may straddle successive contacts, rest on the same contact, or rest with one brush on a contact and the other in the space between contacts. As an example, the contact segments may have a circumferential length of 25 degrees, and may be spaced from adjacent contacts by 11 degrees. The brushes may be spaced from each other by 18 degrees. The brush spacing is thus large enough to allow the brushes to straddle adjacent contacts and small enough to allow the brushes to rest on a single contact. In a decimal system, where each commutator switch has ten segments, the gear units 50 and 52 are 10 to 1 reduction units so that the brushes 60 and 62 of switch 46 are driven at 1/10 the rate of brushes 64 and 66 of switch 48, while brushes 56 and 58 of switch 44 are driven at 1/100 the rate of the brushes of switch 48. This means that for every complete revolution of the brushes of switch 48, the brushes of switch 46 will make 1/10 of a revolution and the brushes of switch 44 will make 1/100 of a revolution.

Each of the transmitter devices 44, 46, 48 of the analog positioning unit is associated with a corresponding receiver device designated 44a, 46a, and 48a, respectively. Each of the receiver devices has at least two switch decks with contacts corresponding to those of the transmitter devices. The decks of receiver 44a are designated by reference numerals 68, 70, respectively; the decks of receiver 46a by numerals 72, 74, respectively, and the decks of receiver 48a by numerals 76, 78, respectively. Switches 68, 72, and 76 may be any of the many conventional types of homing switches. A homing switch may be defined as one which moves automatically to a position determined by a controller device. The preferred form of switch to be utilized in the present invention is of the solenoid operated stepping type. This type of switch includes a solenoid actuating coil, designated 80, 82, 84 in Fig. 2. The first decks 68, 72 and 76 are arranged to control the homing function of the receiver devices. These switches include contacts 86 which are connected, as by lead wires 88, to the corresponding segments of the associated transmitter commutator switches. Each switch has a conductive rotor 90, 92, 94 arranged to engage wipers 96, one of which is connected to each of the contacts of the switches 68, 72 and 76. The rotors of these switches are provided with a notch 98 of sufficient radial extent to break the circuit with the adjacent wiper at whichever of the contacts it is located. The rotors are also engaged by wipers 100 connected to one terminal of the associated solenoids 80, 82, 84. The other terminals of the respective solenoids are connected to one terminal of a source of potential 102, the opposite terminal of which may be grounded as shown.

The switches of the second deck of each receiver device, respectively, 70, 74 and 78, include a plurality of contacts 104 corresponding to the respective contacts of the other switches. The contacts 104 of each of these switches are electrically interconnected into two electrically separate groups 106, 108 and 110, 112, and 114, 116. The gaps between the adjacent end contacts of the groups of each switch are displaced by 180 degrees, and it will be noted that one of the gaps of each switch lies between the 9 and zero contact for that switch. The switches have wipers 118, 120, and 122, respectively, arranged to rotate about the center of the associated set of contacts and to engage the contacts in sequence. Each of these wipers may be connected to ground as shown.

The rotors of switches 68, 72 and 76 are mounted on the same shafts as the wipers of switches 70, 74, and 78, respectively, (as indicated by the dash lines 79) and rotate in unison with the respective wipers. Each of these shafts may also drive an integer indicator wheel such as wheel 123 (visible through the windows of the display devices of Fig. 1) and in addition may drive a third switch deck 125, the contacts of which may be utilized for actuating a conventional recorder, such as a punched card recorder.

Switch decks 70, 74 and 78 perform an ambiguity preventing function described below. The two groups of contacts of each of these switches are connected, respectively, to the brushes of the transmitter commutator switches for the number place of the next highest order. Thus the groups 114 and 116 of switch 78 (which may be the units switch) are connected by leads 124, 126 to brushes 60 and 62 of commutator switch 46. Groups 110 and 112 of switch 74 are connected by leads 127, 129 to brushes 56 and 58 of commutator 44. Groups 106 and 108 would be connected to the corresponding brushes of the next commutator if one were present.

Brushes 64 and 66 of the first commutator 48 are connected, respectively, to the contacts of a single pole double throw relay 132. The blade of the switch 133 of this relay is operated by a coil 134, which may be energized from a source of potential 136 upon closure of a switch 138, which may be a simple push button. Relay 132 is preferably of the fast-close, slow-release type, and the blade of the switch 133 of this relay is grounded, as indicated. Thus, the relay is arranged to connect either of brushes 64, 66 to ground. When the push button 138 is momentarily depressed, switch 133 will connect brush 66 to ground for a predetermined time and then will reconnect brush 64 to ground.

A primary problem in a device of the type described above is the question of ambiguity. It is almost impossible to make a gear train and a set of brushes accurately enough to eliminate ambiguity without additional equipment. Let it be assumed that the apparatus is positioned to represent the number 69,999. This may represent inches, meters, feet, etc. If the input shaft is re-positioned so that the reading should be 70,000, then the first gear (connected directly to the input shaft) has moved 1/10 of a revolution. The last gear (connected to the integer wheel of the highest order) must move to indicate the number 7 and must therefore be able to resolve 1 part in 100,000 or .0036 degree, which is quite impracticable. If two more units were added so that the largest number read became 999,999, the gear would have to resolve .000036 degree. In the apparatus of the present invention the position of the homing switches is controlled electrically. As will be apparent from the following description of the operation of the system, if again the number being read is 69,999 and the shaft is repositioned to read 70,000 (thereby advancing the first gear 1/10 of a revolution), all of the homing switches will advance one number even if the other gears do not move. By this arrangement the gear train may have commercial tolerances and the accuracy of the unit may still be held within ½ of the smallest number read.

In the operation of the circuit illustrated in Fig. 2, the brushes of the respective transmitter commutator switches are rotated continuously by the input shaft 30. As brush 64 of switch 48 is rotated, successive segments of the switch will be connected to ground through switch 133, in turn grounding the corresponding contacts of switch 76 of the receiver device 48a. As long as the wiper 96 of a grounded contact engages the rotor 94, the energization circuit for solenoid 84 will be complete, and the rotor will continue to rotate until the notch 98 is adjacent the grounded contact. It will be apparent that only one of the contacts is grounded at a given time. Thus, the rotor 94 of switch 76 will follow the rotation of the brush 64 of switch 48. Wiper 122 of switch 78, being on the same shaft as rotor 94, will rotate accordingly.

While wiper 122 engages any of the zero through four contacts of switch 78, brush 62 of commutator 46 will be connected to ground through the wiper. When the wiper engages any of the remaining contacts, brush 60 of commutator 46 will be connected to ground. It will thus be evident that the grounding of brushes 60 and 62 is controlled by switch 78 on the receiver device for the preceding number place or order. The grounding of the segments of commutators 46 causes rotor 92 of homing switch 72 to rotate in the manner described with respect to switch 76, and also causes rotation of wiper 120 of switch 74. The wiper 120 determines which of brushes 56 and 58 on commutator 44 is grounded as described in connection with switch 78.

In the preferred form of the invention, brushes 60 and 62 are arranged to straddle adjacent segments at the instants when wiper 122 of switch 78 crosses the gap between its 9 and 0 contacts, and to rest on the same contact when the wiper crosses the opposite gap. With the dimensions given previously as an example, brushes 60 and 62 may rest 3½ degrees in from the adjacent ends of adjacent contacts when wiper 122 switches from its 9 to its 0 contact, and 3½ degrees in from the opposite ends of the same segment when wiper 122 crosses the gap between its 4th and 5th contact. Since wiper 122 will rotate through 180 degrees between its gaps, and since by virtue of the gear reduction unit 52, brushes 60 and 62 will rotate 18 degrees in the same time, it will be apparent that the foregoing conditions may be met. Thus, as the wiper 122 crosses the gap between its 4th and 5th contact, there will be no change in the connection of the segments of switch 46 to ground, both brushes being on the same contact; but when the wiper 122 crosses the gap between its 9 and 0 contacts, there will be a change, because brushes 60 and 62 are on different segments. It will thus be apparent that switch 78 of the units receiver device controls the operation of the second receiver device 46a. In the same manner switch 74 of the tens receiver device controls the operation of the hundred receiver device 44a. Since each receiver unit controls its next succeeding unit, the highest order unit is in effect controlled by the lowest. By virtue of this arrangement, it is impossible for an ambiguity to exist. The correct reading will be obtained regardless of the fact that gears may not move because of backlash or other gear tolerances.

The relay 132 associated with the first commutator switch 48 may be designated a sequencing switch. Its function is to prevent continual hunting of the first transmitter and receiver unit. When the push button 138 is depressed, switch 133 will be closed on the contact connected to brush 66 for a predetermined length of time necessary to allow the units receiver device to position itself. After this time, the switch 133 will return to its former position, connecting brush 64 to ground. If this brush lies on a contact other than the contact on which brush 66 rests, receiver device 48a (and also receiver devices 44a and 46a depending on the position of wipers 118, 120, 122) will switch as previously described.

Figure 3 illustrates a preferred embodiment of an actual physical configuration of the analog positioning unit. This unit includes a suitable housing 200 through one end of which the input shaft 30 passes. The shaft may be supported for rotation in the housing by suitable bearings 202. Mounted on and surrounding shaft 30 in the space between the bearings are a plurality of sleeves 204, 206, 208, 210, 212. The first sleeve 204 may be splined or otherwise fixed to shaft 30 as indicated at 214 for rotation therewith, while the remaining sleeves are rotatable with respect to the shaft. Each sleeve has a collar 216 which may be formed integrally therewith. Each sleeve supports a gear 218, 220, 222, 224, and 226 which is splined or otherwise fixed thereto for rotation therewith. These gears abut the associated collars so that longitudinal motion to the right-hand end of housing 200 along the input shaft is prevented. Each gear drives a driven gear respectively 228, 230, 232, 234 mounted for rotation on a shaft 238 suitably fixed within the housing 200. Shaft 238 is parallel to the input shaft 30. Each of gears 228 through 234 is fixed to or formed integrally with gears 240, 242, 244 and 246, respectively. Longitudinal displacement of the gears rotatable on shaft 238 is prevented by a pair of sleeves 248, 250 at the opposite ends of the shaft, the sleeves filling out the space on the shaft between the ends of the housing. Gears 240 through 246 drive gears 252, 254, 256 and 258, respectively, which are splined to or otherwise fixed for rotation with the associated sleeves 206 through 212. Gears 218, 228, 240 and 252 form a 10 to 1 gear reduction unit and the same is true of the remaining groups of corresponding gears. It will thus be apparent that gears 218 through 226 rotate at rates which differ by multiples of 10. While five such gears have been illustrated, it will be apparent to those skilled in the art that a lesser or greater number may be employed depending upon the magnitude of the numbers to be displayed.

Each of gears 218 through 226 serves as a brush carrier and is preferably formed of an insulating material such as nylon so that the brushes may be mounted directly on the gears without the interposition of insulators. Referring to Figure 6, each gear supports a pair of brush assemblies 260, 262 (some of which are also shown in Figure 3) and each brush assembly includes a pair of electrically connected brushes 260a, 260b, and 262a, 262b. Brushes 260a and 262a correspond to the pairs of brushes illustrated in Figure 2 for the commutator switches. Brushes 260b and 262b serve to connect the previously mentioned brushes to slip rings so that electrical connections may be made to the revolving brushes.

A typical commutator board is illustrated in Figure 5. This board may comprise a sheet of phenolic material 264 supporting a plurality of the previously described commutator segments 54. The board also supports a pair of slip rings 266 and 268 which are arranged to engage the brushes 260b and 262b of the associated gear brush carrier. Conductors 270 may be supported on one side of the board to provide lead-in connections for the respective segments. Conductors 272 may be supported on the other side of the board to provide lead-in connections for the slip rings, respectively. The metallic portions of the commutator boards, including the segments, slip rings, and lead-in conductors, are preferably formed by conventional printed circuit techniques. By these techniques, which are well known, a commutator may be produced in which the segments and slip rings are substantially flush with the insulating material of the board. The connections between the conductors 272 and the associated slip rings may be made by passing a rivet through the board and into a tab connected to the associated slip rings and outside of the normal path of the associated slip ring brush.

Referring to Figures 3 and 4, the commutator cards are provided with a central aperture 274 through which the sleeves mounted on the shaft 30 pass. One commutator card is mounted adjacent each of the gears 218 through 226 with the brushes of the respective gears arranged adjacent the contacts and slip rings of the associated commutators. The commutator boards are held in mutually fixed parallel planes by a pair of rods 276 fixed to opposite ends of the boards and mounted for reciprocation within the housing 200 by suitable bearings indicated at 278. Rods 276 are connected at one end thereof to a yoke 280 supported by the armature 282 of a solenoid 284 fixed to the housing 200 as on a bracket 286. The yoke and rods are biased to the left in Figure 4 by a coil spring 288 mounted on the armature of the solenoid. The solenoid may be energized from a source of supply 290 by closure of a switch 292 so as to draw in its armature and to move the rods 276 to the right.

When the rods are in their left hand position, the commutator boards are disengaged from the associated brushes on the gear brush carriers. When they are drawn to the right, they are engaged by the associated brushes. The brushes are preferably spring biased to a slight degree. Solenoid 284 constitutes a read-out solenoid and when energized closes the output circuit of the analog positioning unit by engaging the brushes and commutator segments as above. The input shaft 30 may be rotated to any extent desired, as by motion of the carriage in Figure 1, without producing an output reading. However, when a reading is desired, switch 292 is closed, and the segments of the commutator boards engage their associated brushes in positions determined by the shaft rotational information stored in the input shaft and the gear train. Prior to a read-out, the mechanical elements of the analog positioning unit have, of course, followed the rotations of the input shaft and are immediately ready to produce an accurate output reading. This arrangement is highly desirable, since it prevents unnecessary operation of the visual display unit and unnecessary wear of the contacts of the analog positioning unit.

In a general and typical case, the system which has been described above will be used to provide digital indications of the position of the carriage 14 (Fig. 1) with respect to a system of reference axes. Conveniently, the actual drives for shafts such as 30 and 32 will be reversible electric motors 296 and 298, controlled manually or otherwise so as to enable the carriage 14 to be moved to any desired position. As has been stated, one of the advantages of the present invention is that the contact making and breaking parts of the commutators and receiving switches are not continuously operated, but are put in indicating condition corresponding to a new location of carriage 14 only when position information is called for by the operator. As stated in the Boyd application referred to above, a simple push-button may be provided for operation by the user when a new significant position of the carriage 14 has been reached, the operation of this push-button energizing the necessary circuits to cause the indicators 38 and 40 to register that new position. These indicators may be indicators located near the user, and/or they may be more remotely positioned indicators for supervisory purposes. Also, where the digital position information newly registered upon the indicators is to be repeated (for example to a recorder or computer) a separate switching device may be provided to complete the circuits of the commutator assembly to provide the desired readout.

In a typical operation, sequence control means are provided which ensure that indication and readout are accomplished only when the shaft 30, 32 is at rest. To obtain the readout, the sequence control first closes contacts 292 energizing solenoid 284. An interlock is provided to prevent energization of solenoid 284 before the shaft driving motor has come to rest. By way of example only, a time delay may be provided which is greater than any possible coasting time of the shaft. Now the sequence control closes switch 138, but the normally closed (back) contact at 133 does not complete the circuit through the wiper until contacts 294 (Figs. 2 and 4) are closed, which occurs only when shaft 282 has completed movement of the contact boards 264 toward the brushes 260. Closure of contacts 294 now (through front contact of 133) applies potential to the appropriate conductors energizing all the stepping switches. Switch 138, having been only momentarily closed, now opens, but the slow-release action of relay 132 maintains the front closed for sufficient time to allow all the stepping solenoids to take up their new positions. Finally, the front contact of relay 132 is opened (upon expiration of the relay time delay), and the sequence control is automatically recycled.

The sequence control may take any of various forms familiar to the electrical control art, such as a combination of relays having marginal time delays on operation or release, or a series of cam-operated switches controlled by a one-revolution motor with provision for initiating its revolution upon operation of a push-button. In some applications, the desired interlocking of the parts to ensure the proper sequence may be accomplished directly by switches or other elements under the direct control of the moving parts, without any separate time-delay elements. The details of the sequence control form no essential part of the present invention, and hence such details are not included herein.

While preferred embodiments of the invention have been shown and described, it will be apparent to those skilled in the art that many modifications can be made in such embodiments without departing from the principles of the invention. These embodiments are, therefore, illustrative rather than restrictive of the invention, the scope of which is defined in the appended claims, and those modifications which lie within the meaning and range of equivalency of the claims are intended to be included therein.

What is claimed is:

1. In a system for converting rotational shaft position analogs to digital presentations, a plurality of transmitting means corresponding to the successive places of the digital presentations, a corresponding plurality of receiver means coupled to said transmitter means, respectively, each of said transmitting means comprising a multi-contact switch, each said receiver means comprising at least a pair of rotary switches having contacts corresponding to those of the associated transmitting switch, the first of the switches of each pair of receiving switches having means for positioning that pair of switches to conform to the position of the associated transmitting switch and the second of the switches of that pair having means responsive to its progression to a zero indication for advancing the position of the pair of receiving switches for the place of the next highest order.

2. In a system for converting rotational shaft position analogs to digital presentations, a plurality of transmitting means corresponding to the successive places of the digital presentations, a corresponding plurality of receiver means coupled to said transmitter means, respectively, each of said transmitting means comprising a multi-contact switch, each said receiving means comprising at least a pair of rotary switches having contacts corresponding to those of the associated transmitting switch, the first of the switches of each pair of receiving switches having means for positioning that pair of switches to conform to the position of the associated transmitting switch and the second of the switches of that pair having means responsive to its progression to a zero indication for advancing the position of the pair of receiving switches for the place of the next highest order, the contacts of each transmitting switch being connected to the corresponding contacts of each of the first of the pair of associated receiving switches, at least each said transmitting switches beyond that for the lowest order place having a pair of brushes arranged to straddle successive associated contacts, the contacts of the second switch of each pair of receiving switches being connected electrically into two groups, each group of contacts being connected to a brush of the transmitting switch for the place of the next highest order.

3. In a system for converting rotational shaft position analogs to digital presentations, a plurality of transmitting means corresponding to the successive places of the digital presentations, a corresponding plurality of receiver means coupled to said transmitter means, respectively, each of said transmitting means comprising a multi-contact switch, each said receiver means comprising at least a pair of rotary switches having contacts corresponding to those of the associated transmitting switch, the first of the switches of each pair of receiving switches having means for positioning that pair of switches to conform to the position of the associated transmitting switch and the second of the switches of that pair having means responsive to its progression to a zero indication for advancing the position of the pair of receiving switches for the place of the next highest order, the contacts of each transmitting switch being connected to the corresponding contacts of each of the first of the pair of associated receiving switches, at least each said transmitting switches beyond that for the lowest order place having a pair of brushes arranged to straddle successive associated contacts, the contacts of the second switch of each pair of receiving switches being connected electrically into two groups, each group of contacts being connected to a brush of the transmitting switch for the place of the next highest order, the second switch of each pair of receiving switches having a brush arranged to engage the associated contacts in sequence, each said receiving switch positioning means including a source of potential having one terminal arranged for connection to the contacts of the first of each pair of receiving switches.

4. In a system for converting rotational shaft position analogs to digital presentations, a plurality of transmitting means corresponding to the successive places of the digital presentations, a corresponding plurality of receiver means coupled to said transmitter means, respectively, each of said transmitting means comprising a multi-contact switch, each said receiving means comprising at least a pair of rotary switches having contacts corresponding to those of the associated transmitting switch, the first of the switches of each pair of receiving switches having means for positioning that pair of switches to conform to the position of the associated transmitting switch and the second of the switches of that pair having means responsive to its progression to a zero indication for advancing the position of the pair of receiving switches for the place of the next highest order, the contacts of each transmitting switch being connected to the corresponding contacts of each of the first of the pair of associated receiving switches, each said transmitting switches having a pair of brushes arranged to straddle successive associated contacts, the contacts of the second switch of each pair of receiving switches being connected electrically into two groups, each group of contacts being connected to a brush of the transmitting switch for the place of the next highest order, the positioning means for the receiving switches corresponding to the lowest order place including an energization circuit, and means for connecting the brushes of the transmitting switch corresponding to the lowest order place to complete said energization circuit first through one of these brushes and then through the other of these brushes after a time delay.

References Cited in the file of this patent

UNITED STATES PATENTS

| | | |
|---|---|---|
| 2,496,585 | Harper | Feb. 7, 1950 |
| 2,620,980 | Brown | Dec. 9, 1952 |
| 2,620,981 | Benson et al. | Dec. 9, 1952 |
| 2,666,912 | Gow | Jan. 19, 1954 |
| 2,672,605 | Taylor | Mar. 16, 1954 |
| 2,682,045 | Crost | June 22, 1954 |
| 2,700,076 | Goode | Jan. 18, 1955 |
| 2,733,008 | D'Andrea | Jan. 31, 1956 |
| 2,809,369 | Feeney | Oct. 8, 1957 |
| 2,818,557 | Sink | Dec. 31, 1957 |